Feb. 12, 1957  G. A. RUSCHMAN  2,781,147
SHATTER-RESISTANT HARD RUBBER COMPOSITIONS
AND METHOD OF MAKING THEM
Filed Dec. 1, 1949

INVENTOR.
GORDON A. RUSCHMAN,
BY Allen & Allen

ATTORNEYS.

United States Patent Office

2,781,147
Patented Feb. 12, 1957

2,781,147

SHATTER-RESISTANT HARD RUBBER COMPOSITIONS AND METHOD OF MAKING THEM

Gordon A. Ruschman, River Forest, Ill., assignor to The Richardson Company, Cincinnati, Ohio, a corporation of Ohio Application December 1, 1949, Serial No. 130,436

20 Claims. (Cl. 220—21)

My invention relates to fiber-reinforced hard rubber compositions and articles; and it has for one of its primary objects the formation of compositions and articles in which the utmost tensile strength, shatter resistance and resistance to rough handling can be obtained from the quantity of fibrous material present in the composition.

It is an object of my invention to provide a way of making hard rubber articles of remarkable tensile strength and shatter resistance. I shall describe my invention in connection with the manufacture of an article in which these qualities are required in exceptional degree, namely a crate or case for filled beverage bottles; but it will be understood that the utility of the invention is not confined thereto, that the same composition may be used in the manufacture of any article in which similar qualities are desired, and that the teachings of this invention are usefully adaptable to the manufacture of modified compositions and articles not requiring the same strengths and resistances, but in which it is desirable to secure the greatest measure of these qualities derivable from the raw materials employed.

It is an object of my invention to provide compositions, molded articles, and processes of making them which are inexpensive and are capable of competing with articles made of other substances, normally thought to be chaper than hard rubber.

It is, for example, an object of my invention to provide a beverage bottle crate or case which will be low in cost and which will far outlast any non-metallic cases of which I am aware, whether made of moldable substance or of wood.

It is an object of my invention to attain enhanced serviceability in molded articles of complex structure by modifications of the hardness of different parts of the individual articles, as hereinafter explained.

These and other objects of the invention which will be set forth hereinafter or will be apparent to one skilled in the art upon reading these specifications, I accomplish in that composition and molded article and in that procedure of making them of which I shall now describe preferred embodiments. Reference is made to the accompanying drawings wherein.

Figure 1:
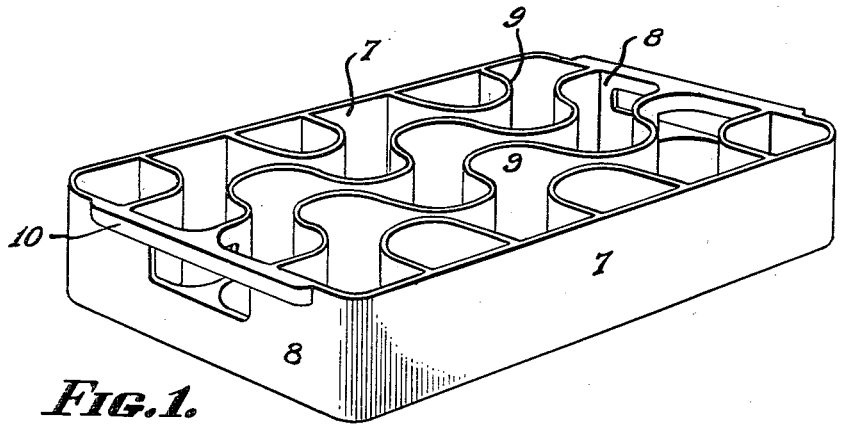
Figure 1 is a perspective view of an exemplary but non-limiting form of bottle crate in which my invention may be embodied.

I have found that it is possible to manufacture molded hard rubber articles of exceptional strength and shatter resistance in which these qualities are derived from a combination of factors which I shall now outline. A large part of the tensile strength and shatter resistance is due to the presence of fibrous reinforcement in the rubber matrix; but the desired qualities do not flow alone from the bare presence of an ingredient of fibrous character in specified proportions. As in other compositions, the reinforcement imparted by the fibrous ingredient is due in preponderant measure to the retention of a suitable fiber length and when the fibrous ingredient is largely in the form of cords or strands made up of a plurality of fibers, to the presence and persistence of these fibrous structures as such.

Briefly in the practice of my invention, I attain the qualities hereinafter set forth by factors which may be listed as follows:

1. The preservation of the fiber length and the structure as set forth above, which in turn necessitates the avoidance of compounding techniques in which homogeneity is attained at the expense of de-fibering of fibrous bundles and destruction of fiber length.

2. Since, as will now be clear, the amount of mechanical energy expended in mixing and compounding must necessarily be small and greatly diminished over that of current practice in rubber compounding, a problem arises in bringing about the necessary association of the fibers and the elastomer or rubber hydrocarbon. This is solved in my invention by producing or making use of a pre-association of the elastomer and the fibrous structures which provides the necessarily intimate association in advance of the compounding and mixing procedures.

3. The shatter resistance and serviceability of the articles are further enhanced by the avoidance of the use of non-fibrous filler materials in such quantity at least as would produce brittleness in the cured article, which brittleness in large measure could offset the strength imparted by the fibrous ingredient.

4. Excessive hardness and brittleness can also be avoided by either limiting the quantity of sulfur employed to the end of diminishing the durometer hardness of the article as hereinafter set forth, or modifying the time-temperature relationship of the curing reaction, or both.

5. The nature and service requirements of the particular article must be kept in mind. By way of a single example, a partitioned bottle crate or case is subjected to over-all hard usage, external blows and the like. At the same time the partitions which are thinner in cross-section than the side walls, end walls and bottom of the crate are subjected to extraordinary strains, as for example, when a crate of loaded bottles is picked up by grasping the necks of adjacent bottles in the hand so as to cock them against partitions and exert a clamping or wedging action by means of which the crate may be carried. The exigencies of such extraordinary service requirements are met in the practice of my invention by the deliberate employment of hardness differentials as respecting different parts of the structure, all as hereinafter more fully described.

I shall now set forth the preparation of an exemplary composition for a bottle crate, taking up in the course of the description the five factors listed above. While it is possible to produce a pre-association of a fibrous structure and an elastomer by associating a fibrous structure such as cords, cloth, or the like with an elastomer in a suitable form such as one in which the elastomer is softened, rendered adhesive, and is rolled on or otherwise brought into intimate contact with the fibrous structure, or is cut back with a solvent or formed into an emulsion or latex, the fibrous structure being dipped therein or otherwise saturated therewith, there is available on the scrap market a material which is inexpensive and which already contains a fibrous structure of suitable form in a highly desirable kind of pre-association with the elastomer.

This material is called "uncured friction stock" and it is a scrap material from the tire building industry. The scrap when taken from the tire builder's floor is usually in the form of a stringy mass of gum-dipped cords. Normally it is run through a mill provided with cracker rolls and comes to the user in a rough slab. At present friction stock is of two types corresponding to the side walls of present-day tires. The first type is a mass of cord dipped in crude natural rubber, the second being a mass of cord dipped in synthetic rubber of the GRS type. Other forms of uncured friction stock are available and a relatively common form is one containing an elastomer made up of 40 parts natural rubber, 40 parts synthetic rubber and 20 parts reclaimed rubber. The term "elastomer" as used herein is inclusive of natural rubber hydrocarbons, all of the sulfur vulcanizable synthetic rubbers, reclaimed natural or synthetic rubbers, and mixtures of any or all of these substances. My invention is applicable to all of them; and a selection may be made in the light of the desired finished qualities of the article, the availability of raw materials and the like. In the practice of my process it may be stated that the natural rubber product is less susceptible to the heat build-up encountered in mixing in a Banbury mixer; but it is readily possible within the skill of the rubber compounder in the light of the teachings herein made to alter the formulation to compensate for this susceptibility as by employing with the synthetic rubbers a slower acting accelerator or the use of retarders.

Uncured friction scrap, as will be evident from the above description, contains organic fibers largely in the form of cords, bundles or threads; and its actual cellulosic content runs around 37%. My invention is not limited to the use of this material or any pre-associated material in which the fibrous ingredient is cotton or cellulosic in nature, since other types of fibers may be employed including mineral fibers, animal fibers, and those of synthetic, proteinaceous nature. The use of uncured friction scrap in the formation of hard rubber compositions has hitherto been suggested; but the compositions have been formed by ordinary compounding techniques involving prolonged working of the masses on rubber compounding or grinding rolls so that the fiber length to all intents and purposes has been destroyed, the tensile strength of the resulting composition being scarcely greater than would be the case if the same quantity or bulk of non-fibrous filler had been employed. The remarkable tensile strengths and shatter resistances characteristic of the material of my invention are in large part attained, as has already been explained, by the preservation not only of the fiber length but also in the particular exemplary embodiment of the fibrous structure in the form of cords, bundles and twisted threads.

In the exemplary form of my invention, namely, the formation of a bottle crate or case in which the utmost strength and shatter resistance is obtained from the available raw material, I take friction scrap, adding to it sulfur, petrolatum or other molding lubricant, and suitable accelerators, and employing a compounding technique in which the fiber length and structure is preserved. The main compounding step is a mixing of the named ingredients in a Banbury-type mixer for two to three minutes at a temperature not over 205° F. and usually lying in the range of 185° to 200° F. All of the named ingredients are added to the mixer; and if the slab form in which the supplier furnishes the uncured friction scrap presents a problem of overload on the Banbury mixer when it is introduced in that form, it is within the scope of my invention to work the scrap over lightly on a rubber mill at a roll setting of approximately ¼-in. before introducing the scrap into the Banbury. Several passes may be given to the material, but the stock should not be allowed to wrap around the mill. The mill, therefore, exerts primarily a comminuting action on the stock without substantial heat build-up and without the development of much tackiness. Such an operation can be performed at the rate of about 800 to 1000 pounds per hour on an ordinary sheeting or mixing mill.

A typical formula for a bottle crate or case is as follows:

| | Parts |
|---|---|
| Friction scrap | 232 |
| Sulfur | 31 |
| MgO | 9 |
| Petrolatum | 10 |
| 808 accelerator | 1 |

The parts in the above formula are by weight. The MgO may be highly calcined magnesium oxide acting as a secondary accelerator. The 808 is a butyraldehyde aniline accelerator, but other rubber accelerators may be employed, and the nature of the accelerator is not a limitation on the invention.

The Banbury is preferably equipped with thermocouples and a means for recording temperature; but an automatic cycle controller is not required. A mill having a ratio in the neighborhood of 1.1 to 1 to permit slabbing of the stock is preferred. In loading the Banbury, the friction stock should be added first followed by the lubricant, other oils if employed, and the accelerators. It may be necessary to lower the ram at this point to force the stock into the mixing chamber. After a few rotations of the rolls, the oils should be sufficiently dispersed to permit the addition of the sulfur. Cooling water may be employed on the mixer jacket. With natural rubber there is a critical temperature in the neighborhood of 225° F. and at no time should the actual batch temperature be permitted to reach that point.

In employing stock which contains synthetic rubber, a more slowly acting accelerator may be employed or a retarder added. The addition of a retarder permits the stock to attain higher temperatures, say, up to 230° F., that may be found inherent in the synthetic stocks without risk of precure or scorching.

After having been treated in the Banbury mixer, the mass may be cooled if desired before further processing. The additional processing will involve a light milling on a rubber mill having cold rolls, the entire milling not occupying over about 2 or 3 minutes. If the material is milled directly in the hot state from the Banbury, I prefer to permit small portions of the batch to fall upon the mill and give them one quick pass to dissipate heat. The material may be collected in the mill pan until the entire batch has had the heat dissipating pass. The stock should then be worked from the mill pan with care to prevent banking or banding around the mill. In other words, the operator should be careful to pull the stock away from the roll bite at the underside of the mill. If the material is allowed to band around the rolls, heat will be developed in it; there will be graining; and the fiber length will be substantially shortened. Moreover, the material is very difficult to cut from the rolls.

In milling my stock two or three passes should be sufficient to attain the proper consistency for molding. The material may be sheeted on the mill if desired and subsequently cut into parts for mold loading. In this event, after milling, the stock will be racked for cooling or dusted as with talc to prevent sticking. However, it is an advantage of my composition and procedure that the article may be molded by direct flow from a plastic mass, weighed after milling, and balled for introduction into the mold cavity. Or the article may be molded from cold composition in a form suitable for introduction into the mold. If the latter procedure is to be practiced, the material may be cooled after milling and then run through a rotary knife cutting hog, after which it can be stored as desired.

Figure 2:
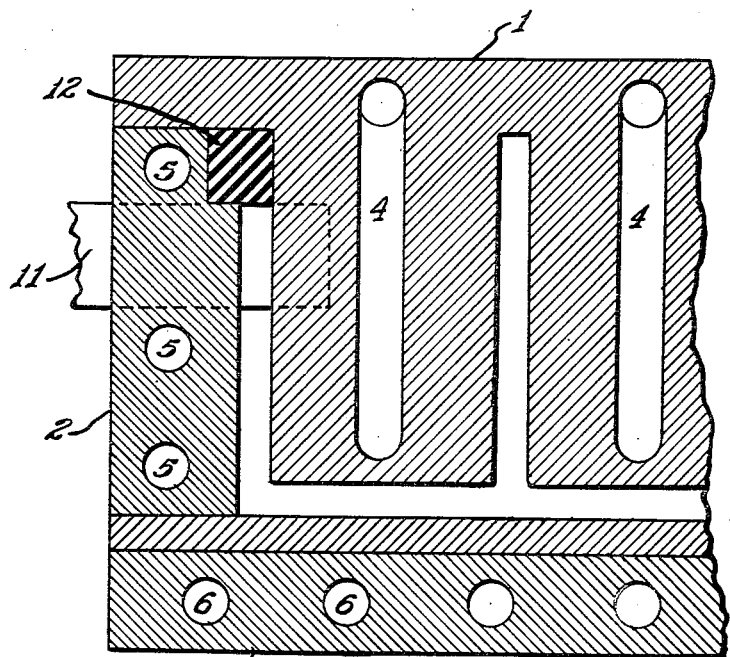
Figure 2 is a partial vertical section of a mold assembly which may be employed in the formation of the exemplary article.

In Figure 2 I have shown a partial cross-section of a mold having a plunger 1, a case or mold block 2 and a bottom supporting element 3. The mold showing is simplified, and may be elaborated as desired. The three parts mentioned are provided with passageways for heating fluid such as steam, the passageways in the plunger being indicated at 4, those in the block at 5, and those in the bottom support at 6. It will be understood that the mold is located in a suitable hydraulic press, the block being fastened down by means, not shown, to the lower platen, and the plunger attached to the ram. Connections for steam or other heating fluid are made to the several passageways in the named elements and means, such as valves, for differential temperature control are provided for a purpose hereinafter set forth. In the exemplary embodiment the mold will be configured within to produce an article such as is shown in perspective in Figure 1, having side and end walls 7 and 8 and partition elements 9 which may be of serpentine form. The central portions of the end walls of the bottle crate or case are widened as at 10 to produce hand grip members; and the end walls are provided with hand holes beneath these grips, adjacent portions of the partitions being recessed to provide space for the fingers. The perforation of the end walls and the recessing of the partitions are accomplished by a supplementary plunger element shown at 11 in Figure 2.

As indicated, the compound may be sheeted and cut to form side wall, end wall, bottom and partition parts which may be arranged in the cavity of the mold block and the cavities of the plunger prior to molding. But since it is preferred for economy to mold the article either from a ball of dough-like plastic substance or from the comminuted product of the hog, in either of these instances the material will have a long draw, and in passing and re-forming about the supplementary plungers 11 would produce knit lines in the end walls of the crate. This may be avoided, as taught in the copending application of Charles L. Keller, Serial No. 690,736, filed August 15, 1946, now Patent No. 2,626,079, and entitled Bottle Carrying Case, by cutting a bar 12 of the composition designed to form the hand grip extension and if desired the upper part of the end wall and locating this piece in the mold as shown in Figure 2, resting it upon a shoulder therein provided for the purpose. In molding, no plastic flow will occur in this bar, and hence no knit lines. The remainder of the bottle case or crate will be formed by plastic flow as will be readily understood. The separate connections to the plunger, the block and the bottom supporting plate permit the maintenance of these parts at different temperatures so that there can be produced when desired, a differential of hardness in the molded article. By way of a single example but without limitation, I may heat the plunger to 345° F., the block to 340° F. and the bottom plate to 335° F. With the composition set forth above and a press dwell of 14 to 15 minutes in the formation of the particular bottle case or crate illustrated, the Shore durometer (D scale) hardness of the side and end walls and bottom of the case will run from 68 to 74 and will average 70 to 72. At the same time the partitions are slightly softer, having a durometer hardness of around 65 to 67 on the same scale, but will not be soft enough to cause excessive sulfur bloom.

When the molded article is removed from the mold, it may be placed on a table and a shrink fixture applied to it during cooling as will be readily understood by the skilled worker. With a press dwell of 14 to 15 minutes, a 20-minute press cycle is attainable. The press may be equipped with automatic means for controlling the cycle if desired, especially where the case is molded from a lump of dough-like plastic or from the comminuted product of the hog. Best results will be obtained if the mold plunger is urged to final position in a series of steps or stages, permitting a more uniform flow of the plastic substance without the exercise of undue pressure. The particular article may be readily molded at pressures of 1500 pounds per square inch.

It will be noted in the above exemplary formula that the quantity of sulfur is relatively low. The uncured friction scrap usually already contains sulfur and accelerators which would permit vulcanization to soft rubber, and this may be taken into account in calculating the quantity of sulfur to add to the mix in the Banbury mixer. I am, of course, not limited to the use of any particular quantity of sulfur but have given an exemplary quantity which will give better tensile strength and more resilience under the conditions set forth. Hard rubber is usually considered any vulcanized rubber product having a hardness of from 70 upwards on the durometer D scale. In conventional hard rubber practice, from approximately 42% to 45% by weight of sulfur based on the weight of the rubber hydrocarbon or elastomer is employed. My products may be made with comparable amounts of sulfur, and while they will have somewhat less tensile strength and resilience, they will nevertheless have better tensile strength due to the preservation of the fiber length and structure than would be the case in any other procedure of which I am aware. Further, the specific quantity of sulfur, even when low as in my preferred practice, can be varied in accordance with the specific temperature conditions under which the article is to be used. Somewhat more sulfur may be added to compositions for articles to be used in the tropics than for articles to be used in temperate or cold climates.

It will be noted further that in the specific formula I am forming an article essentially of the uncured friction scrap substance, simply vulcanizing to the extent indicated the rubber hydrocarbon or elastomer contained therein, through the use of sulfur and accelerators. This together with a soft cure gives the maximum tensile strength, toughness and shatter resistance obtainable from this material. No fillers have been employed nor any substances of diluent character which were not already present in the friction scrap itself. Such substances may, however, be added to my compositions for various specific purposes, and while they may diminish the tensile strength and resistance to cracking and shattering upon rough handling, the principles of my invention are nevertheless realized in obtaining a better tensile strength, resilience and shatter resistance than would be the case otherwise.

Since in the exemplary form of my invention the fibers persist through to the final article in the form of clumps, bundles, threads or cords, these somewhat impair the appearance and finish of the article. It is possible to use a refined friction stock which has been run two or three times through a rubber refining mill. In such a stock the fibrous bundles, cords and aggregates will be largely broken up or separated without excessive shortening of the fiber length. Such a material treated as herein set forth will still provide the maximum tensile strength and shatter resistance obtainable from fibers in the specific condition, while at the same time improving surface appearance and finish. It is believed that a salient aspect of my invention lies in the discovery that where a wetting of the fiber with the elastomer phase has occurred in a pretreatment such as that to which friction stock has been subjected in manufacture, then a 2- to 3-minute compounding in a Banbury at a low temperature, followed by a 2- to 3-minute working on cold rolls, will satisfactorily distribute the ingredients to the extent that successful hard rubber compositions and articles may be produced while preserving the fibrous length and structure of the reinforcement, and with the production of remarkable tensile strengths and shatter resistances.

Again, it is possible to add elastomer from other sources to a formula such as that set forth above. The addition of elastomer which is not in association with fibers will, of course, diminish the total percentage of fibrous reinforcement and hence the tensile strength and shatter resistance. But many articles require greater tensile strength and shatter resistance than can be attained with hard rubber made by conventional processes without requiring the extraordinary strengths and resistances of the exemplary articles herein described; and in the formation of such articles, other sources of elastomer may be employed in part. It is even possible to add some fibrous material which is not in pre-association with elastomer, either alone or along with added elastomer. But the utmost in tensile strength and shatter resistance is attained only when the fiber has been prewet with the elastomer phase as hereinabove set forth.

Yet again, other materials may be added to impart special qualities to molded articles made in accordance with my process. By way of example, it has been found that the addition of comminuted neoprene scrap will impart grease- and oil-resistance to the composition, and will increase resistance to heat deformation. Where this quality is desired, a typical formula may be:

| | Parts |
|---|---|
| Friction scrap | 170 |
| Refined neoprene scrap | 80 |
| 808 accelerator | 1 |
| Petrolatum | 11 |
| Sulfur | 31 |
| HCMgO | 7 |
| Indonex 364½ | 10 |

Again, the parts are by weight. The Indonex is a well-known processing oil or plasticizing substance, and is helpful due to the addition of the neoprene scrap.

The neoprene scrap should be prepared as follows: In order to be handled properly, it should be run through a rotary knife-type grinder equipped with a ¼-in. screen. From the grinder, the scrap is worked on a refining mill of preferably about a 2 to 1 ratio at a roll setting of .005-in. to .007-in. until it has been ground to a particle size of approximately 10 to 30 mesh. Here again care should be exercised to keep the material as cool as possible during the grinding operation so as to eliminate any such build-up of heat on the rolls as would result in a lacing of the particles together or the production of a tacky mass. The product of the mill should be a comminuted, crumb-like solid.

Using neoprene scrap, the procedure above outlined may be followed in the way set forth, the scrap being added along with the ingredients in the Banbury mixer. The times of treatment in the Banbury and the subsequent treatment on rubber rolls are not varied.

The neoprene formula produces a structure of less tensile strength and shatter resistance but of great resistance to oils and greases and heat.

Tensile strengths of molded articles formed in accordance with my preferred procedures average around 6000 pounds per square inch made from normal uncured friction scrap. The length of fibers in the composition will for the most part run from approximately 1½-in. to 2-in. In testing bottle crates or cases, it is a practice to suspend a loaded crate or case as though it were a pendulum, pull it out a fixed distance from a solid abutment and allow it to swing against and be stopped by the abutment. Blows at a calculable energy in foot pounds are thus imposed upon the structure, and it will be rotated during the test so that these blows occur successively on an end wall, a corner, a side wall and so on. Beverage bottle cases or crates tested at a force of 78 foot pounds and made in accordance with my invention of the first formula set forth above sustain over 1600 blows before failure. Similar structures made of the second formula set forth above and containing the neoprene scrap sustain upwards of 800 to 1000 blows. By comparison the standard wooden bottle case or crate designed to hold the same number of filled bottles does not sustain more than about 100 blows before failure. In a standard shatter test in which ordinary commercial hard rubber compositions sustained only about ½ foot pounds and similar test bars of the highest grade commercial hard rubber composition sustained only about 1½ foot pounds, my preferred composition sustained more than 2½ foot pounds.

Modifications may be made in my invention without departing from the spirit of it. Having thus described my invention in certain exemplary embodiments, what I claim as new and desire to secure by Letters Patent is:

1. A process of producing a hard rubber molding composition of enhanced tensile strength and shatter resistance which comprises providing a raw material in which a fibrous ingredient is in intimate wetted association with an elastomer chosen from a class consisting of natural rubber, sulfur-vulcanizable synthetic rubbers, reclaimed natural and synthetic rubbers, and mixtures thereof, said fibrous material being composed substantially of fibers having an average length of approximately 1½ inches to 2 inches, compounding the starting material with sulfur and accelerator in a Banbury mixer for a time of substantially 2 to 3 minutes at a temperature of substantially 185° to 200° F., and thereafter milling the product of the Banbury mixer on cold rolls for a time duration of substantially 2 to 3 minutes without permitting the material to band upon the rolls, whereby the length of said fibers will be substantially unchanged.

2. The process of claim 1 in which the starting material is uncured friction scrap.

3. The process of claim 1 in which the starting material is uncured friction scrap, and in which the quantity of sulfur is around 31 parts by weight to 100 parts of the elastomer.

4. The process claimed in claim 3 wherein the uncured friction scrap contains fibers in the form of bundles and cords and in which this form of the fibers persists through to the final molded and cured article.

5. A process of producing hard rubber molding compositions of enhanced tensile strength and shatter resistance which comprises providing an intimate pre-association of fibrous material composed substantially of fibers having an average length of approximately 1½ inches to 2 inches and an elastomer chosen from a class consisting of natural rubber, sulfur-vulcanizable synthetic rubbers, reclaimed natural and synthetic rubbers, and mixtures thereof, by causing the elastomer to wet the fibrous material when the elastomer is in a soft condition, and thereafter mixing the pre-associated elastomer and fibrous material with sulfur and molding lubricant in a Banbury mixer for substantially 2 to 3 minutes at a temperature of substantially 185° to 200° F., and milling the product of the Banbury mixer on cold rolls without banding for a period of substantially 2 to 3 minutes.

6. The process claimed in claim 2 which includes the step of adding neoprene scrap of substantially 10 to 30 mesh to the material in the Banbury mixer.

7. The process claimed in claim 5 which includes the step of adding neoprene scrap of substantially 10 to 30 mesh to the material in the Banbury mixer.

8. A process of making molded articles of enhanced tensile strength and shatter resistance which comprises subjecting uncured friction scrap, sulfur and accelerator to the action of a Banbury mixer for substantially 2 to 3 minutes at a temperature of substantially 185° to 200° F., and thereafter to a milling on cold rolls for substantially 2 to 3 minutes without banding, and molding and vulcanizing an article therefrom, said uncured friction scrap comprising fibrous material in intimate wetted association with an elastomer chosen from a class consisting of natural rubber, sulfur-vulcanizable synthetic rubbers, reclaimed natural and synthetic rubbers, and mixtures thereof, said fibrous material being composed substantially of fibers having an average length of approximately 1½ inches to 2 inches, said average fiber length persisting through to the molded article.

9. The process claimed in claim 8 in which the sulfur is employed in an amount equivalent to approximately 31 parts by weight to 100 parts of rubber hydrocarbon in the elastomer present in the composition.

10. The process claimed in claim 8 in which the sulfur is employed in an amount equivalent to approximately 31 parts by weight to 100 parts of rubber hydrocarbon in the elastomer present in the composition, and in which the article produced is a partitioned box-like structure formed in a mold having a heated plunger, a heated block, and a heated base plate, and in which the heat applied to said several parts is varied to produce a harder cure of external portions of said article than of said partitions.

11. The process claimed in claim 8 in which the sulfur is employed in an amount equivalent to approximately 35 parts by weight to 100 parts of rubber hydrocarbon in the elastomer present in the composition, and in which the article produced is a partitioned box-like structure formed in a mold having a heated plunger, a heated block, and a heated base plate, and in which the heat applied to said several parts is varied to produce a harder cure of external portions of said article than of said partitions, and in which the cure produces a durometer D scale hardness of said external portions of substantially 68 to 74 and in said partitions of substantially 65 to 67.

12. A molded hard rubber article consisting primarily of friction scrap substance containing a sulfur-vulcanizable elastomer and fibrous material, said elastomer being vulcanized with sulfur, said article having a tensile strength of substantially 6000 and said fibrous material existing therein in the form largely of cords and bundles having an average length of approximately 1½-in to 2-in.

13. A molded hard rubber article consisting primarily of friction scrap substance containing a sulfur-vulcanizable elastomer and fibrous material, said elastomer being vulcanized with sulfur, said article having a tensile strength of substantially 6000 and said fibrous material existing therein in the form largely of cords and bundles having an average length of approximately 1½-in. to 2-in., said article having an average durometer D scale hardness of 68 to 74.

14. A molded hard rubber article consisting primarily of friction scrap substance containing a sulfur-vulcanizable elastomer and fibrous material, said elastomer being vulcanized with sulfur, said article having a tensile strength of substantially 6000 and said fibrous material existing therein in the form largely of cords and bundles having an average length of approximately 1½-in. to 2-in., said article having an average durometer D scale hardness of 68 to 74, as to external portions thereof, said article being in the form of a partitioned box and having a durometer D scale hardness of the partitions therein of substantially 65 to 67.

15. A molded hard rubber bottle crate or case having a composition consisting of sulfur-vulcanized elastomer and fiber in which the fibrous ingredient exists for the most part in the form of cords and bundles having an average fiber length of 1½-in to 2-in., said case being capable of sustaining substantially 1000 blows at 78 foot pounds.

16. A molded hard rubber bottle crate or case having a composition consisting of sulfur-vulcanized elastomer and fiber in which the fibrous ingredient exists for the most part in the form of cords and bundles having an average fiber length of 1½-in. to 2-in., said case being capable of sustaining substantially 1000 blows at 78 foot pounds, having the form of a partitioned box-like structure with a durometer hardness of external portions thereof of substantially 68 to 74 and of the partitions thereof of substantially 65 to 67.

17. A molded bottle crate or case in the form of a partitioned box-like structure formed of a composition consisting essentially of uncured friction scrap and comminuted neoprene, said friction scrap consisting of elastomer and a fibrous ingredient principally in the form of bundles and cords, said bundles and cords being composed substantially of fibers having an average length of approximately 1½ inches to 2 inches, said elastomer being in sulfur vulcanized condition, external portions of said article having a durometer D scale hardness of substantially 68 to 74, the partition elements thereof having a hardness of substantially 65 to 67, the fibrous structure of said article remaining in the form of bundles and cords of substantially undiminished fiber length.

18. A process of producing a hard rubber molding composition of enhanced tensile strength and shatter resistance which comprises providing a raw material in which a fibrous ingredient is in intimate wetted association with an elastomer, said fibrous material being composed substantially of fibers having an average length of approximately 1½ inches to 2 inches, said elastomer being selected from a group consisting of natural rubber, sulphur vulcanizable synthetic rubbers, reclaimed natural rubbers, reclaimed synthetic rubbers and mixtures of these substances; compounding the starting material with sulphur and accelerator in a Banbury mixer for a time of substantially 2 to 3 minutes at a temperature of substantially 185° to 200° F., and thereafter milling the product of the Banbury mixer on cold rolls for a time duration of substantially 2 to 3 minutes without permitting the material to band upon the rolls, whereby the length of said fibers will be substantially unchanged.

19. The process of claim 18 in which the starting material is uncured friction scrap, said scrap comprising a mass of cord dipped in said elastomer.

20. A process of producing a hard rubber molding composition of enhanced tensile strength and shatter resistance which comprises providing a raw material in which a fibrous ingredient is in intimate wetted association with an elastomer chosen from a class consisting of natural rubber, sulfur-vulcanizable synthetic rubbers, reclaimed natural and synthetic rubbers, and mixtures thereof, said fibrous material being composed substantially of fibers having an average length of approximately 1½ inches to 2 inches, compounding the starting material with sulphur and accelerator in a Banbury mixer for a time of substantially 2 to 3 minutes at a temperature of substantially 185° to 200° F., and thereafter milling the product of the Banbury mixer on cold rolls for a time duration of substantially 2 to 3 minutes without permitting the material to band upon the rolls, whereby the length of said fibers will be substantially unchanged.

References Cited in the file of this patent

UNITED STATES PATENTS

| Number | Name | Date |
|---|---|---|
| D. 150,031 | Richards | June 22, 1948 |
| 914,905 | Williams | Mar. 9, 1909 |
| 1,426,672 | Radford | Aug. 22, 1922 |
| 2,064,162 | Hottel | Dec. 15, 1936 |
| 2,283,448 | Malek | May 19, 1942 |
| 2,300,735 | Spokes | Nov. 3, 1942 |
| 2,339,474 | Hardin | Jan. 18, 1944 |
| 2,363,508 | Doster et al. | Nov. 28, 1944 |
| 2,414,171 | Scharf | Jan. 14, 1947 |
| 2,482,600 | Sarbach | Sept. 20, 1949 |
| 2,626,079 | Keller | Jan. 20, 1953 |